Nov. 7, 1939.  L. H. ROETH  2,178,881
BALL BEARING MOUNTING FOR VIBRATOR HEADS
Filed Sept. 2, 1938  2 Sheets-Sheet 1
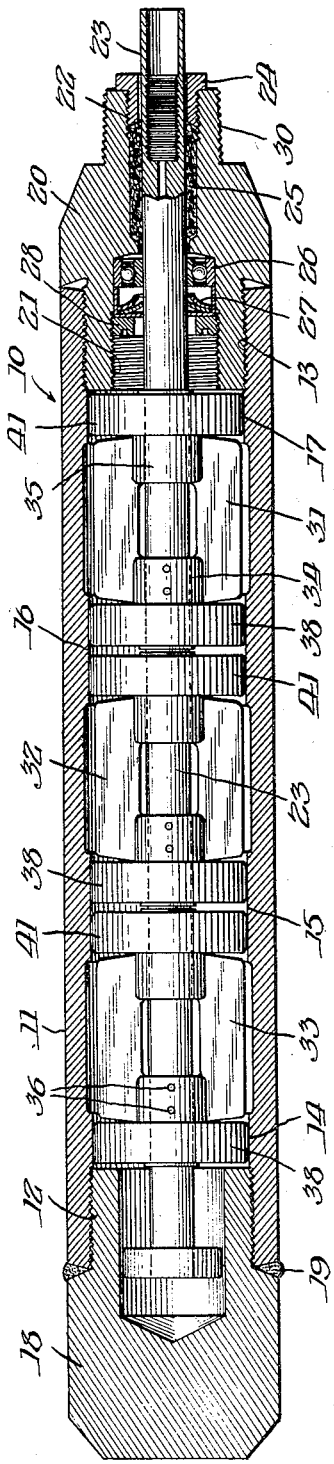
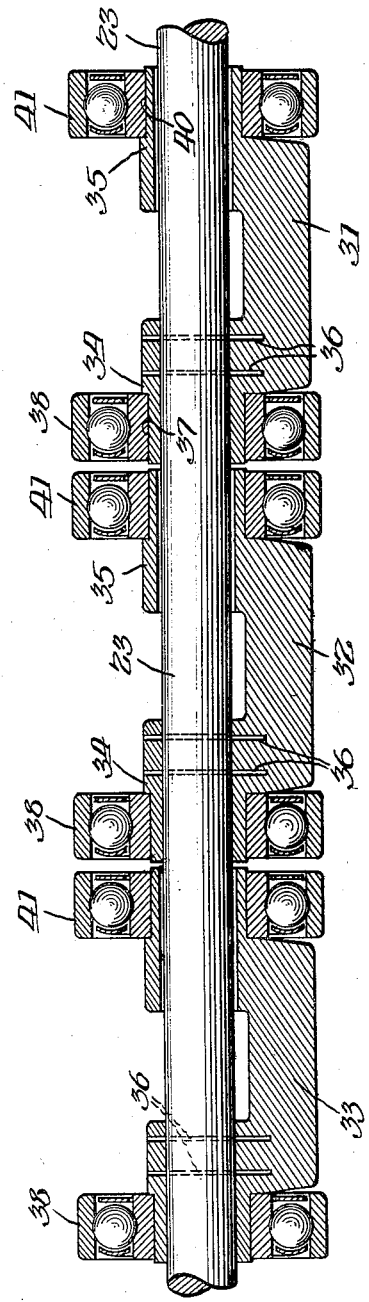
Inventor:
Louis H. Roeth Nov. 7, 1939. L. H. ROETH 2,178,881
BALL BEARING MOUNTING FOR VIBRATOR HEADS
Filed Sept. 2, 1938 2 Sheets-Sheet 2
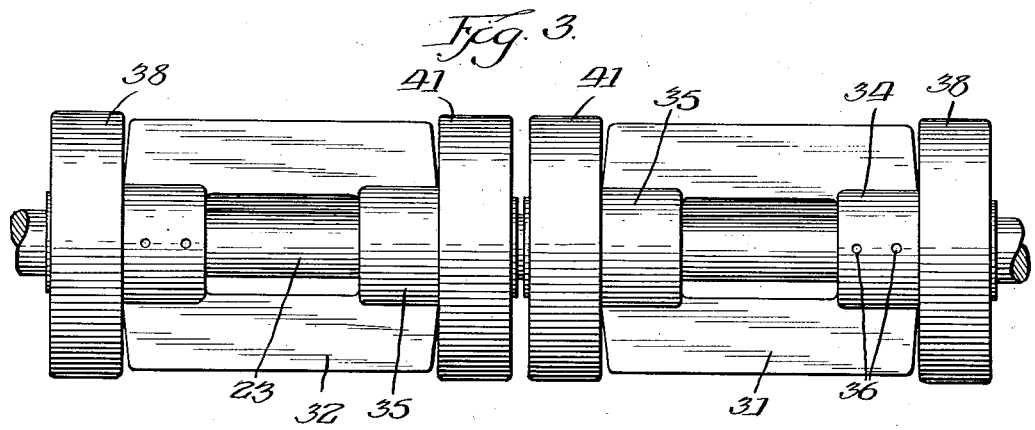
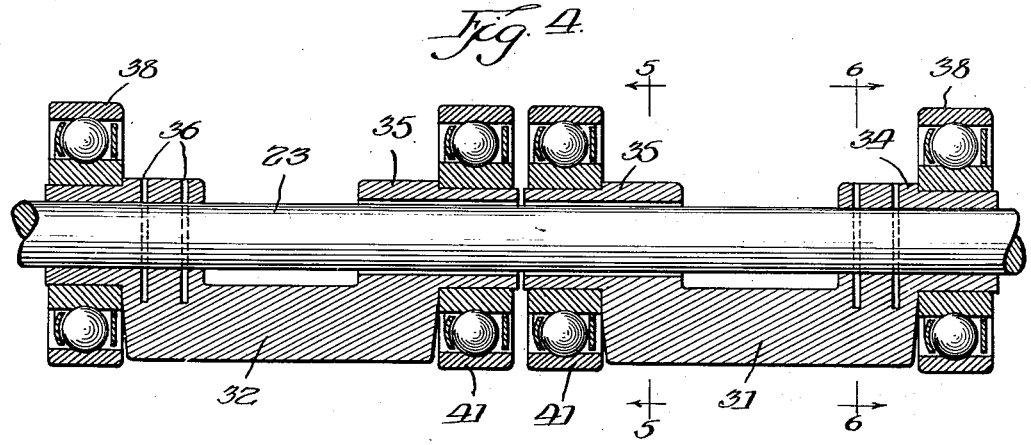
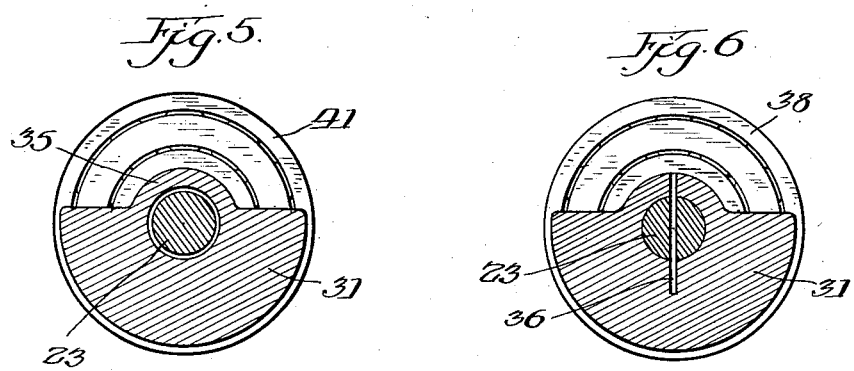
Inventor:
Louis H. Roeth Patented Nov. 7, 1939

2,178,881

UNITED STATES PATENT OFFICE 2,178,881

BALL BEARING MOUNTING FOR VIBRATOR HEADS

Louis H. Roeth, Chicago, Ill.

Application September 2, 1938, Serial No. 228,092

6 Claims. (Cl. 259—72)

The invention relates to mounting means for revolving eccentric weights or the like and has more particular reference to a ball bearing mounting for the vibrating element of a concrete vibrator head.

In concrete vibrators the vibrating element consists of a shaft havig fixed thereto one or more eccentric weights which are fitted with bearings for rotatably mounting the shaft and weights within a cylindrical head. One end of the head is sealed, whereas, the shaft projects from the other end and connects with a source of power for driving the shaft. It has been found that a certain amount of centrifugal force is necessary for an efficient vibrator. This force increases as the speed of rotation increases and consequently for a high speed vibrator a plurality of bearing elements are required to carry the load.

However, in prior structures the mounting of two ball bearing elements side by side was the cause of considerable wear and tear on said bearings since each bearing was affected by variations in concentricity of the other. This required spacing of the bearing elements and as the length of the vibrator head was necessarily limited, the number of bearings was insufficient to carry the load especially for high speed operation.

It is an object of the present invention to provide an improved vibrator head having the maximum amount of weight in the eccentrics and which will employ the proper number of ball bearing elements for withstanding the enormous forces encountered in high speed operation.

Another object of the present invention resides in an improved structure of mounting for revolving eccentric weights and the like, wherein two ball bearing elements may be positioned side by side, since the structure effectively compensates for variations in concentricity of the elements.

Another object is to provide a mounting for revolving eccentric weights having bearings at the ends thereof wherein the driving shaft is fixed to each weight at one end and wherein clearance is provided between the driving shaft and the other end of each weight.

With these and various other objects in view, the invention may consist of certain novel features of construction and operation, as will be more fully described and particularly pointed out in the specification, drawings and claims appended hereto.

In the drawings, which illustrate an embodiment of the invention, and wherein like reference characters are used to designate like parts—

Figure 1 is a longitudinal sectional view taken through a vibrator head embodying the features of the present invention;

Figure 2 is a sectional view taken longitudinally through the concentric weights and bearing elements to better illustrate the improved feature of the invention;

Figure 3 is an elevational view showing a ball bearing mounting in accordance with the invention for two eccentric weights;

Figure 4 is a longitudinal sectional view showing a modified form of the invention in connection with the mounting of two eccentric weights;

Figure 5 is a transverse sectional view taken substantially along line 5—5 of Figure 4; and Figure 6 is a transverse sectional view taken substantially along line 6—6 of Figure 4.

Referring to the drawings, particularly Figure 1, the present invention is illustrated in connection with a concrete vibrator head 10 used to vibrate poured concrete and which consists of a cylindrical portion 11 interiorly threaded at each end, as at 12 and 13. The inside surface of portion 11 is accurately machined at a plurality of places, as at 14, 15, 16 and 17, for accommodating ball bearing elements to be more particularly described in detail. One end of the cylindrical portion 11 is closed by plug 18, threaded thereto at 12, the said plug and portion being further securely united by the weld 19. To the other end of the cylindrical portion is threaded a fitting 20 having a passage therethrough of varying diameter, said passage being threaded at its inner end as at 21 and at its outer end at 22.

The vibrating means for the head includes a shaft 23 extending axially of the head and which projects through fitting 20 to extend a short distance beyond said fitting. This end of the fitting is closed by gland 24 which confines packing 25 within the recess of said fitting and in contact with the rotating shaft 23. A ball bearing element 26 journals said end of the shaft within the fitting 20 and to the left of said bearing there is provided an oil and grease seal designated in its entirety by numeral 27. The internal threads 21 formed in the fitting receive the nut 28 which is positioned adjacent the oil and grease seal to thus retain the same in place. The nose end of the fitting 20 is exteriorly threaded at 30 by which the vibrator head is secured to a flexible shaft, not shown, or other instrumentality, having operative connection with shaft 23 for rotating the same.

As better shown in Figure 2, the shaft 23 carries one or more eccentric weights, which in the present embodiment number three, being identified by numerals 31, 32 and 33. Each weight is substantially U-shape in longitudinal section, having axially directed portions 34 and 35 which are bored to receive the shaft 23. It will be noted that portion 34 of each eccentric is provided with an opening therethrough substantially equal to the diameter of the shaft 23 and accordingly this axially directed portion has a tight fit on the shaft, and further, the eccentric weights are each secured to the shaft adjacent said portion by pins 36. The opening in the axially directed portion 35 of each weight is larger than the diameter of the shaft and accordingly there is clearance between the shaft and this portion of each weight. The axially directed portion 34 is exteriorly machined at 37 to provide a seat for the ball bearing element indicated in its entirety by numeral 38. In a like manner the portion 35 is exteriorly machined at 40 to provide a seat for the bearing element 41.

When the vibrating means above described is assembled within the cylindrical portion 11 of the head 10 the several ball bearing elements are positioned so as to seat on the machined surfaces, namely, 14, 15, 16 and 17 provided therefor. For example, the surfaces 14 receive a bearing element 38, which element is in turn securely fitted to the machined part or axially directed portion 34 formed on weight 33. This end of the weight is fixed to the shaft 23. The machined surfaces 15 and 16 each accommodate two ball bearing elements and which are positioned side by side. However, element 41 is fitted to portion 35 of weight 33 and between said portion and the shaft clearance exists so that this end of the weight is in effect free of the shaft, having floating relation therewith. The other bearing element, namely, 38, is associated with the fixed end of weight 32. Therefore, although the bearing elements are disposed side by side, they will operate independently of each other, since only one bearing element has fixed relation with the driving shaft 23. Surface 17 accommodates the bearing element 41 fitted to portion 35 of weight 32 and which is free as regards shaft 23 since clearance exists between said shaft and this axial portion of the weight. It is preferred to have this free end of weight 31 adjacent the fitting 20 since the shaft is fixed to bearing element 26, located relatively adjacent bearing element 41. The close proximity of two bearing elements, if both are fixed to the shaft, results in considerable wear and tear on the elements as variations in concentricity of one seriously affects the other. However, in the present structure the bearing elements operate independently as regards the element adjacent thereto. This is best illustrated in connection with surfaces 15 and 16, each of which accommodates two bearing elements positioned close together. Element 38 in each instance is fixed to the shaft 23. However, the adjacent element 41, positioned on the same surface therewith, is free as regards the shaft, being mounted on the floating portion 35 of its respective weight. It may be assumed that the bearing elements differ in concentricity by a few thousandths of an inch, or that the seats for the elements are inaccurate to the extent where a few thousandths of an inch variation exists between the same. Nevertheless, these variations in concentricity of the seats or elements is compensated for by the present structure of mounting since one of the two adjacent elements operates independently of the shaft and therefore independently of its companion element.

Referring to Figures 3 and 4, a modified form of the present invention is illustrated as applied to the mounting of two eccentric weights. The eccentric weights 31 and 32 are illustrated as carried by shaft 23 which forms the driving means therefor, as previously explained with respect to the structure of Figure 2. However, weight 31 is positioned on said shaft so that its fixed end, namely, the axially directed portion 34, is located to the right. The other or floating end 35 of said weight 31 is accordingly directed toward the left and is located adjacent the floating end 35 of the second weight 32. In this respect, therefore, the structure differs from that shown in Figure 2, since the bearing elements 41 are disposed in side by side relation. As each element is free as regards the shaft, it is clear that they have operation independently of each other.

In the operation of the vibrator head the shaft 23 is rotated at a relatively high speed in the neighborhood of seven thousand revolutions per minute. The eccentric weights are journalled by the bearings and the shaft and weights thus rotate with respect to the head. However, the weights set up a vibration that is imparted to the head and which, when inserted in poured concrete, will vibrate and settle the same so that a harder and more compact concrete mass results.

The centrifugal forces acting on the bearings increase as the speed of rotation of the eccentrics increases. In the present structure a sufficient number of bearings can be employed to carry the load encountered in high speed operation since the improvements enable two bearing elements to be positioned side by side. One bearing element journals the shaft, whereas, the adjacent element in effect journals an eccentric weight independently of the shaft and thus inaccuracies in the construction of either bearing element or inaccurate machining of either seat is not transmitted to the companion bearing element.

The invention is not to be limited to or by details of construction of the particular embodiment thereof illustrated in the drawings, as various forms of the device will of course be apparent to those skilled in the art without departing from the spirit of the invention or the scope of the claims.

What is claimed is:

1. In combination, a shaft having connection with a source of power for rotating the same, a weight having end portions concentrically disposed with respect to the shaft and having an eccentric intermediate body portion, one of said end portions being fixed to the shaft, said other end portion being free and having floating relation with respect to the shaft, a bearing element journalling the shaft at the end having the weight fixed thereto, and a second bearing element journalling the portion which has floating relation with respect to the shaft.

2. In combination, a shaft having connection with a source of power for rotating the same, an eccentric weight fixed at one end to the shaft and having an axially extending portion at its other end disposed in surrounding relation with the shaft but spaced therefrom, whereby said axially extending portion has floating relation with respect to the shaft, a ball bearing element journalling the shaft at the end having the weight fixed thereto, and a second ball bearing element journalling said axially extending portion.

3. In combination, a shaft having connection with a source of power for rotating the same, a plurality of eccentric weights carried by said shaft and rotating therewith, one end of each weight being fixed to the shaft, and each weight at its other end having an axially extending portion surrounding the shaft but spaced therefrom, a bearing element positioned adjacent that end of each weight which is fixed to the shaft for journaling the shaft, and a bearing element fixed to the axially extending portion of each weight, and which therefore operates independently of the elements journalling the shaft, said weights being arranged longitudinally of the shaft so that adjacent bearing elements will have operation independently of each other.

4. In combination, a shaft having connection with a source of power for rotating the same, at least one bearing element journalling said shaft, an eccentric weight extending longitudinally of the shaft and fixed thereto at its end adjacent said bearing element, said weight throughout the remainder of its length being free of the shaft whereby the opposite end thereof has floating relation with respect to the shaft, and a second bearing element fixed to said floating end for journalling said weight.

5. In combination, a shaft having connection with a source of power for driving the same, a plurality of bearing elements spaced longitudinally of the shaft for journalling the same, an eccentric weight associated with each bearing element and fixed to the shaft at the end adjacent its respective element, each weight being free of the shaft throughout the remainder of its length whereby the opposite end thereof has floating relation with respect to the shaft, and a bearing element fixed to the opposite end of each weight for journalling the same.

6. In a concrete vibrator head, a shaft extending axially within said head and having connection at one end with a source of power for rotating the same, a plurality of bearing elements spaced longitudinally of the shaft for journalling the same within the head, eccentric weights positioned longitudinally of the shaft and each having an axially extending portion at one end disposed in surrounding relation with the shaft but spaced therefrom, means non-rotatably securing the other end of each weight to the shaft at a point adjacent one of said bearing elements, and a bearing element for journalling the axially extending portion of each weight and which will be located in close proximity to one of the first mentioned bearing elements, whereby each second mentioned element will have operation independently of the first mentioned elements which journal the shaft.

LOUIS H. ROETH.